United States Patent
Ananthanarayanan et al.

(10) Patent No.: US 8,234,570 B2
(45) Date of Patent: Jul. 31, 2012

(54) HARVESTING ASSETS FOR PACKAGED SOFTWARE APPLICATION CONFIGURATION

(75) Inventors: Rema Ananthanarayanan, New Delhi (IN); Kathleen Byrnes, Piscataway, NJ (US); Charbak Chatterjee, Kolkata (IN); Maharshi Desai, Fairfax, VA (US); Pankaj Dhoolia, New Delhi (IN); Sweefen Goh, Hartsdale, NY (US); Richard T. Goodwin, Hawthorne, NY (US); Mangala Gowri, New Delhi (IN); Anca A. Ivan, San Jose, CA (US); Juhnyoung Lee, Hawthorne, NY (US); Senthil Kk Mani, New Delhi (IN); Pietro Mazzoleni, Hawthorne, NY (US); Rakesh Mohan, Hawthorne, NY (US); Debdoot Mukherjee, New Delhi (IN); Aubrey J. Rembert, Hawthorne, NY (US); Gerhard Sigl, Bedford, NH (US); Manas R. Kumar Singh, Kolkata (IN); Vibha S. Sinha, New Delhi (IN); Biplav Srivastava, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 12/605,689

(22) Filed: Oct. 26, 2009

(65) Prior Publication Data

US 2011/0099470 A1  Apr. 28, 2011

(51) Int. Cl.
*G06F 15/00* (2006.01)
*G06F 9/44* (2006.01)

(52) U.S. Cl. ........ 715/255; 715/204; 715/234; 715/256; 717/101; 717/123

(58) Field of Classification Search .................. 715/200, 715/201, 202, 203, 204, 205, 206, 207, 209, 715/210, 226, 228, 234, 253, 254, 255, 256, 715/273, 274, 700, 760; 717/100, 101, 103, 717/104, 106, 107, 108, 109, 110, 111, 113, 717/114, 116, 120, 121, 123, 159, 162, 165, 717/168, 170, 171, 172
See application file for complete search history.

(56) References Cited

U.S. PATENT DOCUMENTS

| | | |
|---|---|---|
| 4,371,075 A | 2/1983 | Erlichman |
| 5,041,396 A | 8/1991 | Valero |
| 5,343,527 A | 8/1994 | Moore |
| 5,487,141 A | 1/1996 | Cain et al. |
| 5,566,330 A | 10/1996 | Sheffield |
| 5,652,835 A | 7/1997 | Miller |

(Continued)

OTHER PUBLICATIONS

Dellby et al., Optimized Quadrupole-Octupole C3/C5 Aberration Corrector for STEM, Proceedings of the Seventh International Conference on Charged Particle Optics, Physics Procedia, 2008, 179-183, 1.

(Continued)

*Primary Examiner* — Maikhanh Nguyen
(74) *Attorney, Agent, or Firm* — Scully, Scott, Murphy & Presser, P.C.; William Stock, Esq.

(57) ABSTRACT

Harvesting assets for packaged application practices, in one aspect, may include obtaining one or more work products associated with deployment of packaged software applications, extracting content and style, enhancing content and style with models of work products, and storing assets in asset repository.

14 Claims, 4 Drawing Sheets

U.S. PATENT DOCUMENTS

| | | | |
|---|---|---|---|
| 5,724,589 | A | 3/1998 | Wold |
| 5,737,727 | A | 4/1998 | Lehmann et al. |
| 5,805,898 | A | 9/1998 | Barsness et al. |
| 5,880,675 | A | 3/1999 | Trautner |
| 5,884,079 | A | 3/1999 | Furusawa |
| 5,956,708 | A | 9/1999 | Dyko et al. |
| 5,965,858 | A | 10/1999 | Suzuki et al. |
| 5,987,443 | A | 11/1999 | Nichols et al. |
| 6,018,731 | A | 1/2000 | Bertrand et al. |
| 6,256,773 | B1 | 7/2001 | Bowman-Amuah |
| 6,305,548 | B1 | 10/2001 | Sato et al. |
| 6,311,316 | B1 | 10/2001 | Huggins et al. |
| 6,427,230 | B1 | 7/2002 | Goiffon et al. |
| 6,470,338 | B1 | 10/2002 | Rizzo et al. |
| 6,606,740 | B1 | 8/2003 | Lynn et al. |
| 6,736,903 | B2 | 5/2004 | Minazzoli |
| 6,738,156 | B1 | 5/2004 | Simpson et al. |
| 6,836,841 | B1 | 12/2004 | Wu et al. |
| 6,851,104 | B1 | 2/2005 | da Silva |
| 6,904,449 | B1 | 6/2005 | Quinones |
| 6,907,546 | B1 | 6/2005 | Haswell et al. |
| 6,959,268 | B1 | 10/2005 | Myers et al. |
| 6,961,918 | B2 | 11/2005 | Garner et al. |
| 7,971,180 | B2 * | 6/2011 | Kreamer et al. .............. 717/101 |
| 8,055,606 | B2 * | 11/2011 | Kreamer et al. ................ 706/62 |
| 2002/0069137 | A1 | 6/2002 | Hiroshige et al. |
| 2002/0194053 | A1 | 12/2002 | Barrett et al. |
| 2003/0046282 | A1 | 3/2003 | Carlson et al. |
| 2003/0097433 | A1 | 5/2003 | Park et al. |
| 2003/0145006 | A1 | 7/2003 | Dalfsen et al. |
| 2004/0128374 | A1 | 7/2004 | Hodges et al. |
| 2005/0131941 | A1 | 6/2005 | Dettinger et al. |
| 2005/0149343 | A1 | 7/2005 | Rhoads |
| 2007/0079299 | A1 * | 4/2007 | Daly ............................ 717/141 |
| 2007/0118507 | A1 | 5/2007 | Bruner |
| 2007/0276714 | A1 | 11/2007 | Beringer |
| 2008/0189261 | A1 | 8/2008 | Andreev et al. |
| 2008/0313008 | A1 * | 12/2008 | Lee et al. ......................... 705/10 |
| 2008/0313110 | A1 * | 12/2008 | Kreamer et al. ................ 706/12 |
| 2008/0313596 | A1 * | 12/2008 | Kreamer et al. .............. 717/101 |
| 2009/0063794 | A1 | 3/2009 | Green |
| 2009/0138293 | A1 | 5/2009 | Lane et al. |
| 2011/0083120 | A1 | 4/2011 | Bhandar et al. |

OTHER PUBLICATIONS

Frakes et al., Software Reuse and Reusability Metrics and Models, 1996, pp. 1-32.

Davis et al., Dialogue Specified Reuse of Domain Engineering Work Products, 1994, pp. 28-36.

Glushko, Patterns and Reuse in Document Engineering, 2002, pp. 1-13, file://C:\Documents%20and%20Settings\glushko\My%20Documents\xml%20conference.

Boukottaya et al., Document Reuse Tool for Communities of Practice, E. Tomadaki and P. Scott (Eds.): Innovative Approaches for Learning and Knowledge Sharing, EC-TEL 2006 Workshops Proceedings, ISSN 1613-0073, p. 235-244, 2006.

U.S. Official Action mailed Nov. 28, 2011 in co-pending U.S. Appl. No. 12/652,978.

* cited by examiner

HARVESTING ASSETS FOR PACKAGED SOFTWARE APPLICATION CONFIGURATION

BACKGROUND

The present disclosure relates generally to computer applications, and more particularly to managing information relating to the configuration and deployment of packaged software applications. One example of a packaged software application is an Enterprise resource planning (ERP) application, a company-wide computer software system used to manage and coordinate all the resources, information, and functions of an organization from shared data stores. An ERP service project is a complex activity relating to the deployment of packaged software application, which involves months, sometimes, years of effort from many consultants. Consultants in such projects often rely on a large amount of various documents as the primary means to gather and share information and knowledge, often by using office productivity tools such as document editors, spreadsheet tools, drawing and presentation tools. Information stored using such tools are difficult to reuse, and often the data created and stored using those tools are difficult to compile. For example, the productivity tools do not provide any way to access, collate and report on the information.

BRIEF SUMMARY

A method and system for harvesting assets for packaged software application configuration are provided. The method in one aspect may include obtaining one or more documents defining deployment procedures associated with deploying a packaged software application. The method may also include extracting content and style from the one or more documents, and creating one or more objects corresponding to the extracted content and style. The method may further including storing the one or more objects as assets in an asset repository.

A system for harvesting assets for packaged software application configuration, in one aspect, may include a computer executable module operable to obtain one or more documents defining deployment procedures associated with deploying a packaged software application. The computer executable module may be further operable to extract content and style from the one or more documents, and create one or more objects corresponding to the extracted content and style. A storage device may be operable to store the one or more objects as assets in an asset repository.

A computer readable storage medium storing a program of instructions executable by a machine to perform one or more methods described herein may be also provided.

Further features as well as the structure and operation of various embodiments are described in detail below with reference to the accompanying drawings. In the drawings, like reference numbers indicate identical or functionally similar elements.

DETAILED DESCRIPTION

The present disclosure is directed to methods and systems that create and link work product models for packaged software application configuration, and harvest those models. Packaged software application configuration is also referred to as packaged application practices. The composed models may be used to manage project information.

"Service delivery methods" generally refer to methods for deploying and configuring software applications in an organization. Service delivery methods define work products in projects. Examples of service delivery methods may include Ascendant™ methods for the SAP™ practice, and OUM™ (Oracle Unified Method) for the Oracle practice. Ascendant™ methods for the SAP™ practice refer to complete methods for implementing SAP software in an organization. It includes a structured approach to what needs to be done, when it needs to be done, how it should be done, and how it should be controlled. Similarly, Oracle Unified Method (OUM) was developed by Oracle™ and is an iterative and incremental software development process framework for supporting the successful implementation of all Oracle products—applications, middleware, and database.

"Work products" refer to documents, for example, usually in paper or in electronic form or the like, rendered, for example, from tools such document editors, graphics editors, spreadsheet tools, e.g., Microsoft™ Word™, PowerPoint™, Excel™, Visio™, Adobe PDF™, HTML, and others. A piece of computer code or program such as the WRICEF is another example of work product. WRICEF refers to workflows, reports, interfaces, conversions, enhancements and forms, commonly used in SAP projects. Work products are related to business artifacts. In the system and method of the present disclosure, the logic of a work product may be externalized in models, for example, in extended mark language (XML) or other structured form, and physically rendered to those documents, as needed. Examples of work product may include but are not limited to documents specifying the following: Mission Statement, Technical Infrastructure Scope, Initial Risk Mitigation Strategy, Initial Project Scope, Implementation and Rollout Strategy, Project Team Organization Structure, Updated Project Plan, Project Team Training Plan, Legacy System Change Strategy, Capacity Planning Strategy, Archiving Strategy, Communications Plan, Project Documentation Standards, Technical Design Document, Development System, Backup Strategy, Production Support Plan Deployment, Project Review and Signoff, and others.

"Business artifact" refers to an information entity that is produced and shared in the course of the application life cycle such as requirements, gap, process, functional specification, technical specification and others. Gap refers to the difference between the as-is status and to-be (desired) status, in terms of transformation, i.e., organization's process, IT and organization structure. Transformation using packaged applications such as SAP™ and Oracle™ systems is an activity to fill the gap to transform the enterprise to the desired status.

A "template" of one or more work products refers to a representation of work products for consumption captured in paper or the like. Templates are usually prepared for a service delivery method, e.g., to deploy and configure software applications. Templates include one or more sections (e.g., introduction, requirements, metrics, etc.) with styles and forms (e.g., font, color, etc.). Template, for example, may be one single document or different documents or different versions of documents, for instance, in a text editor form such as Microsoft™ (MS) WORD™. A template, for example, has a standard format and content of a work product type that, for example, service delivery method consultant(s) may start with to create a work product instance. In the traditional art, both templates and work product instances are physical objects in some word processing file such as MS™ Word™ or Excel™ document. The system and method of the present disclosure separates the logical object (i.e., model) from the physical object (i.e., work product in MS™ Word™ or the like). With the system and method of the present disclosure, work can be done in the logical object while the physical objects (e.g., in MS™ Word™) can be generated when needed. The term "work product template" is used interchangeably with the term "template" in this disclosure, and both terms refer to a template of one or more work products as described herein.

A "model" of one or more work products refers to structured representation of one or more work products for machine and/or computer program consumption, captured, for example, in XML or other markup language or structured data format or the like. Models may be created in the method and system of the present disclosure. Each model may include one or more objects.

An "object" in a model is a representation of a work product document, section or element of one or more work products or the like. Models are said to be "shredded" into multiple objects. That is, a model may be divided into multiple objects. Each object may include content, style elements of a work product, and additional metadata.

A "link" is a representation of a relationship between objects across one or more work product models. Examples of relationships may include repetition (e.g., overlap among two or more work products), dependency, and association. For instance, "Business process" may be linked to a "requirement" or a "gap" which is, in turn, linked to a "gap resolution", which is, in turn, linked to "use cases", "test cases", "test scripts", "test plans", and others, in an ERP project.

"Assets" are work products and other project materials. We use the term "objects" to refer to elements and components of work products, especially in the context of models of work products. Examples of work products and assets may include PDD (Process Definition Document), Requirement, GAP, RICEFW, etc.

A "starter set" is a set of assets (work products and other project materials and documents) from previous projects that can be reused for the present project, searched and selected from the asset repository based on the characteristics of the present project scope.

Figure 1:
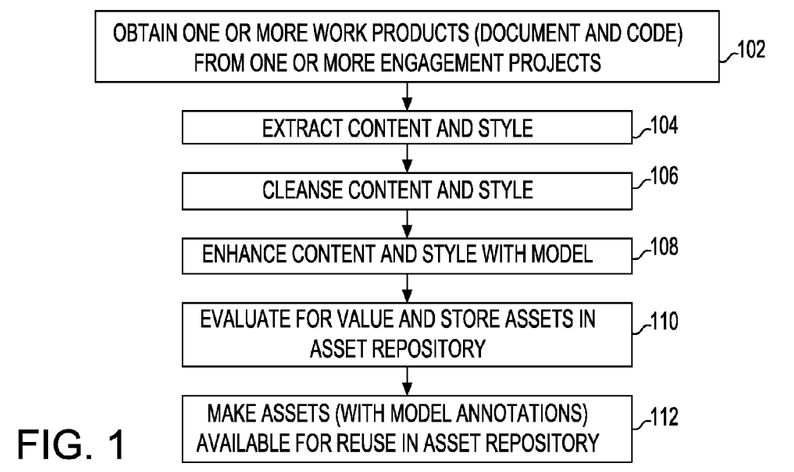
FIG. 1 is a flow diagram illustrating a method in one embodiment for harvesting assets by using work product models for packaged application practices.

FIG. 1 is a flow diagram illustrating a method in one embodiment for harvesting assets by using work product models for packaged application practices. At 102, one or more work products from one or more engagement projects are obtained. Work products may include one or more documents and/or codes. One or more engagement projects, for example, are projects for delivering service, for example, using one or more service delivery methods.

At 104, content and style from the obtained one or more work products are extracted. Content refers to elements of work products, for example, sections, subsections, lists, tables, which may be represented in objects in the models. Style refers to formats of the elements, for example, fonts, color, texture (if any), indentation, page layout, page numbers, footnotes and headers, image size, spacing, and other. An example algorithm used to extract content and style is described with reference to FIG. 2.

Figure 3:
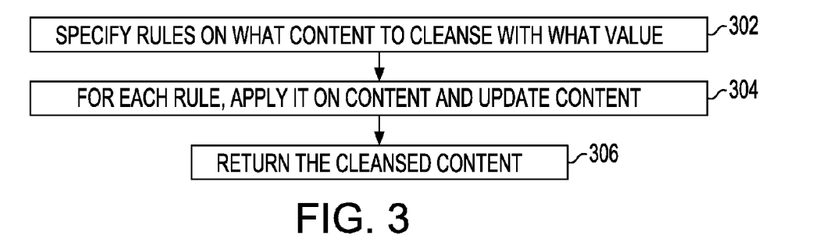
FIG. 3 is a flow diagram illustrating a method in one embodiment for cleansing content and style.

At 106, optionally, content and style may be cleansed. For example, specific information associated with the work products such as client name and other confidential information, may be deleted or masked from the content and style. Examples of the information that may be deleted or masked may include, but are not limited to, contract price, consultant and client staff names and their contact info. FIG. 3 illustrates an example of an algorithm employed in one embodiment to cleanse the content and style. In another aspect, duplicate or similar content such as duplication of a paragraph (which may have occurred in error) may be discovered and merged into one.

Figure 4:
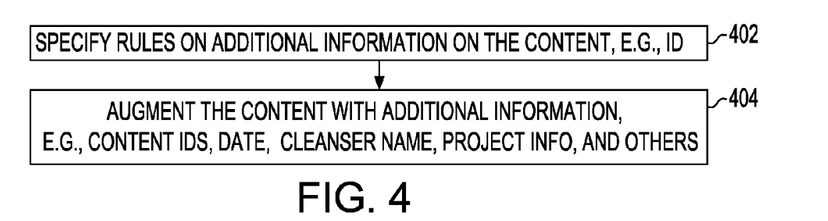
FIG. 4 is a flow diagram illustrating a method in one embodiment for enhancing content and style.

At 108, content and style may be enhanced and aligned with work product models. FIG. 4 illustrates an example of an algorithm used in one embodiment to enhance the content and style.

Figure 8:
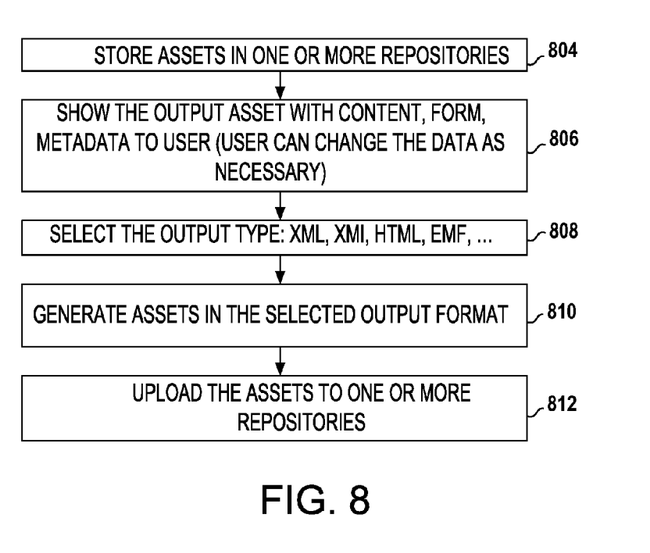
FIG. 8 is a flow diagram illustrating a method in one embodiment for evaluating for value and storing assets in asset repository.

At 110, evaluation may be performed for values and assets stored in asset repository. FIG. 8 illustrates an example of an algorithm in one embodiment that may be employed to evaluate for values and store in the asset repository.

At 112, the assets in the asset repository may be made available, for example, for reuse in another project or engagement.

Figure 2:
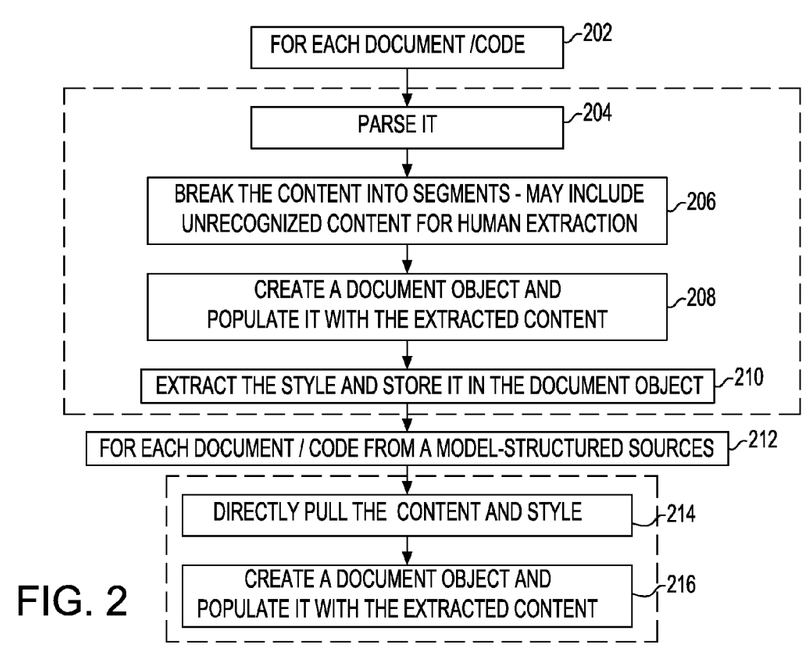
FIG. 2 is a flow diagram illustrating a method in one embodiment for extracting content and style.

FIG. 2 is a flow diagram illustrating a method in one embodiment for extracting content and style. At 202, for each work product, for example, document or code, steps 204, 206, 208, 210 are performed. At 204, the work product is parsed and semantically analyzed, for instance, using tools or techniques such as text analysis and linguistic computation. At 206, the contents of the work product are divided into one or more segments. This may include unrecognizable content for human extraction. At 208, document object is created and populated with the extracted content. At 210, the style is extracted and stored in the document object.

At 212, for each work product from a model-structured source, steps 214 and 216 are performed. Model-structured source includes objects and links generated to represent a work product instance. The model-structured source may have been created, for instance, by analyzing the physical rendering of a work product and converting the elements of the work product into objects and links. Such work products may contain embedded tags that specify the type of objects in the model. At 214, the content and style are directly pulled or retrieved from the model-structured source. At 216, document object is created and populated with the extracted content. At this stage, the document object and the content may be stored in computer memory, e.g., RAM, in an in-memory object format.

FIG. 3 is a flow diagram illustrating a method in one embodiment for cleansing content and style. At 302, rules are specified on what content to clean with what value. For instance, to mask or sanitize client confidential information, the following rules may be implemented: (1) Replace "ABC" (a real client name) with "Client" or "Life Science Client"; (2) Replace "XYZ" (a real project manager name) with "Project Manager". When the cleanser program is run, the user may define the rules as one of input to the program. The program provides examples and guidelines on how to write a complete set of effective cleansing rules, for instance, depending on types of projects.

At 304, each rule is applied on content and the content is updated. At 306, the cleaned content is returned.

FIG. 4 is a flow diagram illustrating a method in one embodiment for enhancing content and style. At 402, rules are specified on additional information on the content. For example, when the enhancer program is run, the user may define the rules as one of input to the program. The program provides examples and guidelines on how to write a complete set of effective augmenting rules, for example, depending on types of projects. Examples of additional information may include but are not limited to identification (ID) of a user who is performing the cleansing function, date, name of the process or person who cleansed the content, project information, and others. At 404, the content is augmented with this additional information.

FIG. 8 is a flow diagram illustrating a method in one embodiment for storing assets in asset repository. At 804, the assets are stored in one or more repositories. At 806, the stored assets with content, form, metadata are shown or presented to a user, for example, using a user interface display or the like, allowing the user to change the data. At 808, the output type for model representation is selected. Examples of output types may include but are not limited to XML, XMI, HTML, EMF, and others. At 810, assets are generated in the selected output format. At 812, the assets are stored in the generated output format to one or more repositories.

Figure 5:
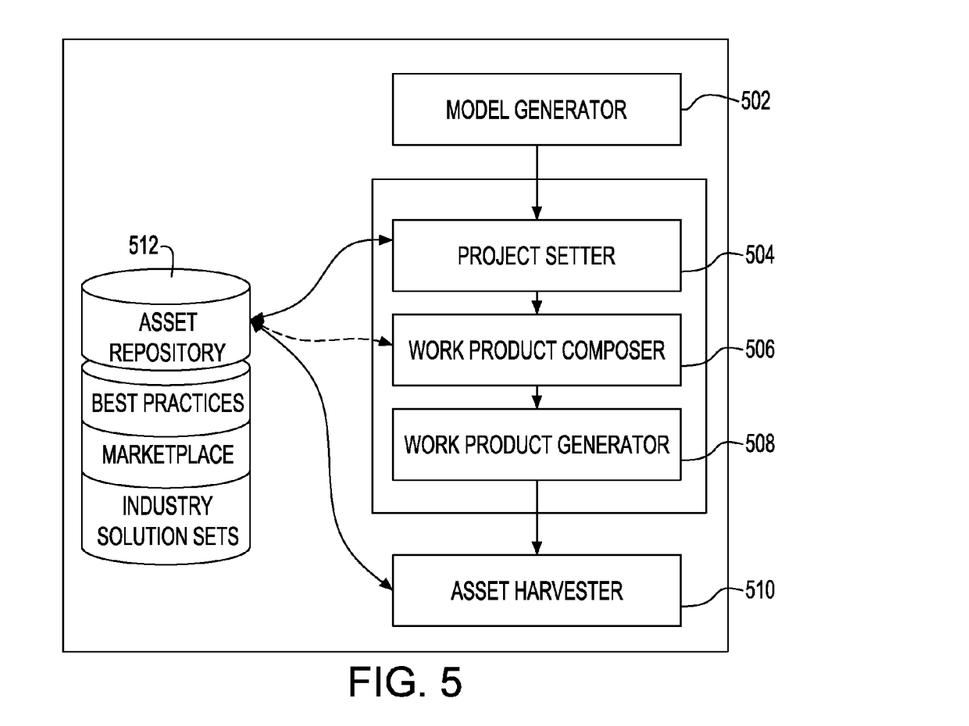
FIG. 5 is a block diagram illustrating a system in one embodiment for creating, linking and using work product models for packaged application practices integrated in conjunction with other functional modules that may utilize the system and method of the present disclosure.

FIG. 5 is a block diagram illustrating a system in one embodiment for creating, linking and using work product models for packaged application practices integrated in conjunction with other functional modules that may utilize the system and method of the present disclosure. A model generator 502 defines and generates models for one or more service delivery methods, for instance, by analyzing work product templates and converting the elements of the work product template into objects and links that form a model representing the service delivery methods structurally.

A "project setter" module 504 receives one or more sets of assets potentially reusable in the current project pushed by asset repository 512, "starter set". Assets are work products and other project materials. The term "objects" is used herein to refer to elements and components of work products, especially in the context of models of work products above. Examples of work products and assets include PDD (Process Definition Document), Requirement, GAP, RICEFW, etc. A starter set is a set of assets (work products and other project materials and documents) from previous projects that can be reused for the present project, searched and selected from the asset repository based on the characteristics of the present project scope. The project setter module 504 helps the user to select a group of assets useful, for example, by displaying the assets and their content by process groups. The assets (or work products) stored in the asset repository include physical renderings of work products.

"Starter set" assets, for example, assets and other materials, documents in various formats (e.g., MS Word, PowerPoint, Excel, PDF, and others) generated throughout the lifecycle of the project set by a service delivery method, are selectively imported to a "work product composer" module 506 in one or more model-based formats. Work products and assets stored in the repository 512 include physical renderings of the work product instances generated and captured in the work product models (logical entity) generated in the model generator module 502 of the present application. Work products in the repository 512 may also include physical renderings of a service delivery method that are manually generated. The "work product composer" module 506 helps the user to search and pull additional assets from the asset repository 512. Candidate assets are assets from previous projects and stored in the repository that are candidates for reuse in the present project. The project refines the imported and applied asset content through the project's lifecycle by using the work product composer. Applied asset content refers to content of the candidate asset reused in creating a work product for the present project. It may be that a candidate asset may not be reused as it is. However, it provides a starting point with format and content that are reusable. The candidate assets may be refined to fit it to the current project.

"Work product generator" module 508 renders the work products in one or more documents and/or computer programs and publishes them. For instance, the work product composer module 506 outputs the content of work products captured in the models and their implementation in the computer program—that is, the logical entity of the work products. The work product generator module 508 takes this logical entity as input and turns it into a physical entity, for example, Microsoft Word format.

The resulting assets, for example, work products as deliverables (i.e., performed via the service delivery method) to the client may be further run through an "asset harvester" module 510 of the present disclosure, which removes client references and converts the assets into structured format, i.e., model. The harvested assets are stored in one or more asset repositories 512 for reuse in future projects.

A user interface or a development environment may be provided in which a user may interact with various components of the system shown in FIG. 5, for example, to create a structured model representing one or more work products, and/or harvest assets from previously used or created work products (from structured model form or manually generated physical rendering of work products).

The information from the generated model may be reused across two or more methodologies to promote collaboration for model definition. That is, models of work products of a service delivery method can be shared for another service delivery method. In addition, existing work products may be utilized to compute new desired feature and evolve existing models that contain those features.

Furthermore, one or more links across objects may be followed to "trace" among work products such as from business process to use cases to test plans, to track project progress proactively. Linked models may allow for change in one model to be reflected in related models and policy checks.

Figure 6:
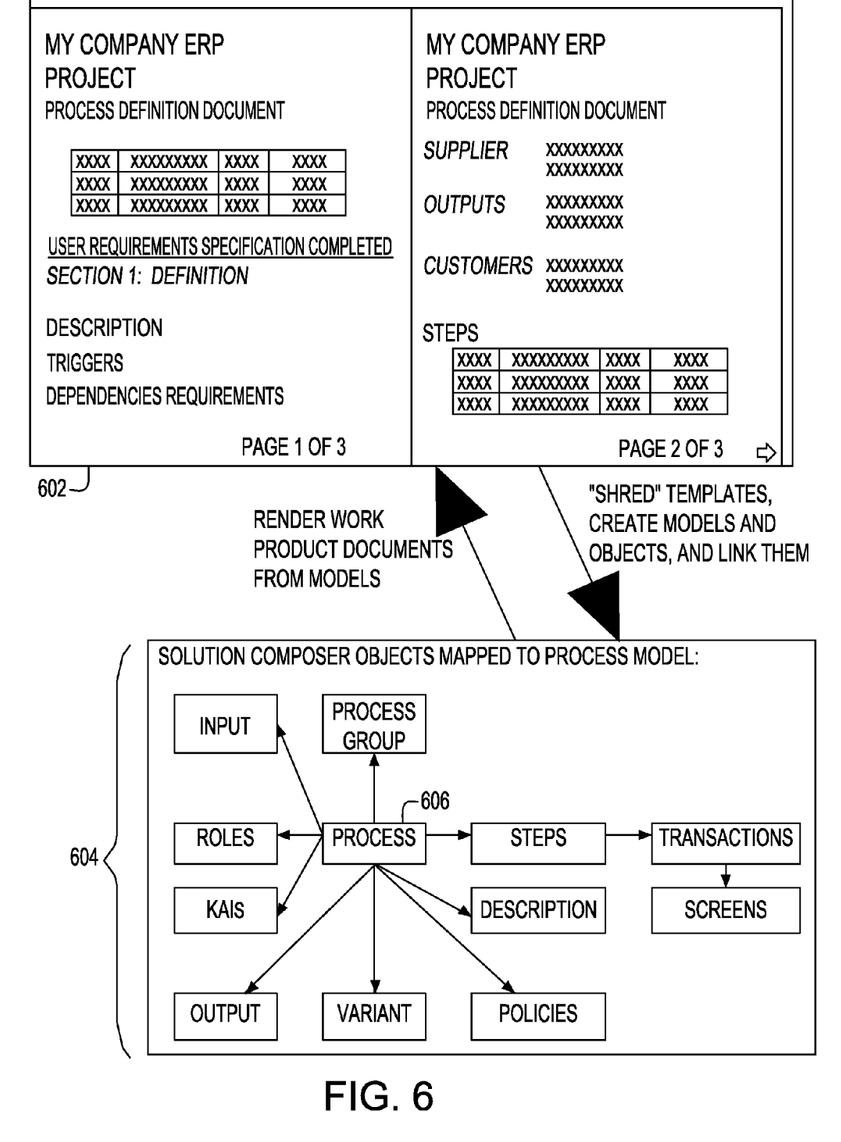
FIG. 6 illustrates an example of a template of a work product and mapping of elements of the template into model of objects.

FIG. 6 illustrates an example of a template of a work product and mapping of elements of the template into a model of objects. A sample work product template 602 may be a document that has process description for service delivery methodology such as SAP implementation. Elements in the template 602 are mapped or converted into objects and links in a model, i.e., a structured, "object-centric" representation of process information, for example, shown at 604. While the figure does not show every detail of the template to model mappings, it shows example elements of a template and model objects. The work product template 602 is a Process Definition Document (PDD) template. PDD defines processes. In an embodiment, each section of the work product template 602 or document is the definition of a process, for example, "Account Payable." So, in the model diagram at 604, the process object 606 is at the center. The section (also referred to as an element) of the template 602 may include many subsection or objects, including for example, input, output, trigger, Key Performance Indicators (KPIs), roles, steps, description, and others. Each subsection becomes an object in the work product's model 604 and is linked to the process object.

Once the model is created across multiple work products, a work product is represented as a subset of the model containing only the objects, i.e., sections and subsections belonging to the work product form the model.

Some objects in a model may belong to multiple work products. This way, the model is an economic representation of a large set of work products in a service delivery method. The model, when represented in a machine-understandable language like XML, can be processed with computer software or the like.

Appendix I shows an example of a generated model rendered in an XML output format. The model in this example is automatically generated from a set of work product templates defined in one or more packaged application service methods. The model contains a set of objects that are defined and used in the work product templates. In this example, the object names include Document, Scenario, Regulation, Gap, Requirement, Risk, KPI, Project, Process, Step, Customer, Supplier, Input, Output, Role, Business Benefit, Transaction, among others. Each object defined in a model generally matches one or more sections and/or subsection in one or more work products they are extracted from. Often, an object may be defined, described and used in more than one work product instances in a project, and this overlap of objects across two or more work product instances results in one or more links among one or more work products in one or more projects.

The model in this example is represented in a machine understandable markup language referred to as XML. Specifically, the representation of this model example takes a special form of an XML language known as "ecore" as defined in EMF (Eclipse Modeling Framework). EMF provides software tools that can be used to automatically generate computer program code in a high-level language such as Java™ from a model in ecore format. The automatically generated code provides basic user interfaces and services for handling the objects defined in the model. The code can further be customized, refined and augmented for the user interface and services with enhanced operations and features.

For use, the generated model is retrieved, customized and configured. Customizing and configuring may include: (1) making variations to the model such as adding new information entities, removing certain existing ones, (2) adding users and assigning roles, (3) defining what documents are needed. Consultants can search for relevant types of data based on certain pre-defined tags such as industry, process, and others. Once the information authoring is complete, the end deliverable document may be automatically generated. The documents so generated in turn may be used to harvest content from those documents to populate the asset repository.

In one aspect, a server may include the repository of assets and provide services to fetch, save and query for data. A front-end interface, for example, which may be Web 2.0-based, may be used by the consultants or the like to interact to generate documents. Reuse module or the like provides the ability to extract information from documents and store it in the model format. The data-interchange format between the components of the present disclosure may be in XML. The generated model (also referred to as an information model) can be a single model or collection of models, and defines the basic artifact types, their attributes and relationships between them. Rather than keeping the information model static, the on-going customization and configurations allow different models to be dynamically generated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 7:
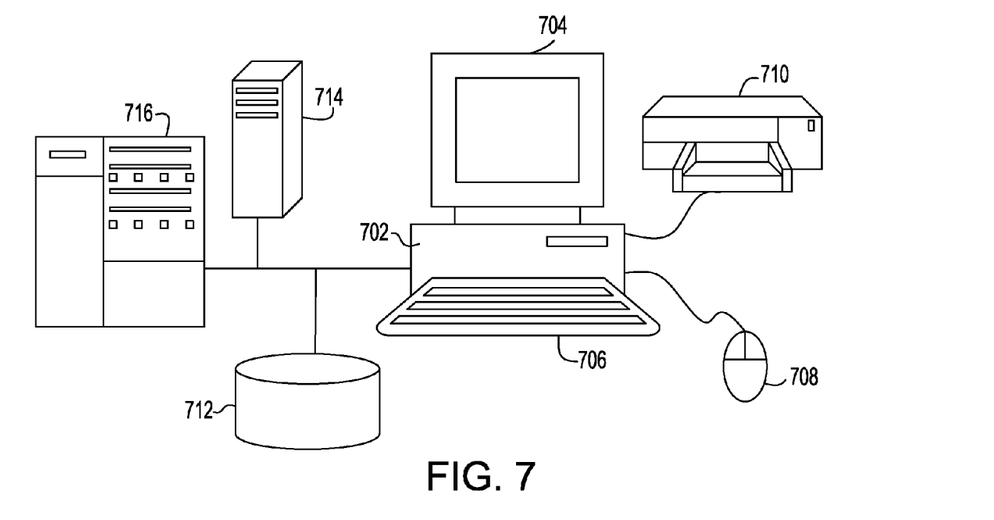
FIG. 7 illustrates an example of a computer system, in which the systems and methodologies of the present disclosure may be carried out or executed.

Referring now to FIG. 7, the systems and methodologies of the present disclosure may be carried out or executed in a computer system 702 that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 704 for presenting output displays and providing a display through which the user may input data and interact with the processing system, for instance, in cooperation with input devices such as the keyboard 706 and mouse device 708 or pointing device. The computer processing system may be also connected or coupled to one or more peripheral devices such as the printer 710, scanner (not shown), speaker, and any other devices, directly or via remote connections. The computer processing system may be connected or coupled to one or more other processing systems such as a server 716, other remote computer processing system 714, network storage devices 712, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 702, 714, 716), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for harvesting assets for packaged software application configuration, comprising:
   obtaining one or more documents defining deployment procedures associated with deploying a packaged software application;
   extracting content and style from the one or more documents, the content including one or more segmented elements of the one or more documents, the one or more segmented elements of the one or more documents include section, subsection, list or table, or combinations thereof, the style including one or more formats of the elements, the formats of the elements include font, color, texture, indentation, page layout, page number, footnote, header, image size, or spacing or combinations thereof;
   creating one or more document objects corresponding to respective one or more elements of the extracted content and style, and populating the one or more document objects with the respective one or more elements of the extracted content and the extracted style;
   storing the one or more document objects as assets in an asset repository;
   enhancing the content in the one or more documents; and
   cleansing the content and style according to one or more rules,
   wherein the cleansing further includes merging duplicate content if a duplicate in the content is discover,
   wherein the enhancing the content in the one or more documents includes adding information associated with identification of a process or user performing the cleansing, date, name of the process or the user, or project information, or combinations thereof, associated with the cleansing, and
   wherein the storing the one or more document objects as assets in an asset repository further includes:
      presenting to a user the one or more document objects with content, form, and metadata;
      enabling the user to select an output type format;
      generating the one or more document objects in the selected output type format; and
      storing the generated one or more document objects in the selected output type format.

2. The method of claim 1, wherein the cleansing includes deleting information associated with specific identification of projects.

3. The method of claim 1, wherein the one or more documents include one or more of electronic text document or code, or combination thereof.

4. The method of claim 1, wherein the extracting step includes discovering the duplicate content.

5. A non-transitory computer readable storage medium storing a program of instructions executable by a machine to perform a method of harvesting assets for packaged software application configuration, comprising:
   obtaining one or more documents defining deployment procedures associated with deploying a packaged software application;
   extracting content and style from the one or more documents, the content including one or more segmented elements of the one or more documents, the one or more segmented elements of the one or more documents include section, subsection, list or table, or combinations thereof, the style including one or more formats of the elements, the one or more formats of the elements include font, color, texture, indentation, page layout, page number, footnote, header, image size, or spacing, or combinations thereof;
   creating one or more document objects corresponding to respective one or more elements of the extracted content and style, and populating the one or more document objects with the respective one or more elements of the extracted content and the extracted style;
   storing the one or more document objects as assets in an asset repository;
   enhancing the content in the one or more documents; and
   cleansing the content and style according to one or more rules,
   wherein the cleansing further includes merging duplicate content if a duplicate in the content is discovered,
   wherein the enhancing the content in the one or more documents includes adding information associated with identification of a process or user performing the cleansing, date, name of the process or the user, or project information, or combinations thereof, associated with the cleansing,
   wherein the storing the one or more document objects as assets in an asset repository further includes:
      presenting to a user the one or more document objects with content, form, and metadata;
      enabling the user to select an output type format;
      generating the one or more document objects in the selected output type format; and
      storing the generated one or more document objects in the selected output type format.

6. The non-transitory computer readable storage medium of claim 5, wherein the stored assets include annotations.

7. The non-transitory computer readable storage medium of claim 5, wherein the cleansing includes deleting information associated with specific identifiers of a project.

8. The non-transitory computer readable storage medium of claim 5, the one or more documents include one or more of electronic text document or code, or combination thereof.

9. The non-transitory computer readable storage medium of claim 5, wherein the extracting step includes discovering the duplicate content.

10. A system for harvesting assets for packaged software application configuration, comprising:
   a processor;
   a computer executable module configured to obtain one or more documents defining deployment procedures associated with deploying a packaged software application, the computer executable module further configured to extract content and style from the one or more documents, the content including one or more segmented elements of the one or more documents, the one or more segmented elements of the one or more documents include section, subsection, list and or table, or combinations thereof, the style including one or more formats of the elements, the one or more formats of the elements include font, color, texture, indentation, page layout, page number, footnote, header, image size, or spacing, or combinations thereof, and create one or more document objects corresponding to respective one or more elements of the extracted content and style, and populating the one or more document objects with the respective one or more elements of the extracted content and the extracted style;
   a storage device configured to store the one or more document objects as assets in an asset repository,
   wherein the computer executable module is further configured to merge duplicate content if a duplicate in the content is discovered,
   wherein the computer executable module is further configured to enhance the content in the one or more documents and cleanse the extracted content and style according to one or more rules,
   wherein the enhancing the content in the one or more documents includes adding information associated with identification of a process or user performing the cleansing, date, name of the process or the user, or project information, or combinations thereof, associated with the cleansing, and
   wherein the computer executable module is further configured to present to a user the one or more document objects with content, form, and metadata, enable the user to select an output type format, generate the one or more document objects in the selected output type format, and store the generated one or more document objects in the selected output type format.

11. The system of claim 10, wherein the stored one or more document object include annotations.

12. The system of claim 10, wherein the computer executable module cleanses by deleting information associated specific identifications of projects.

13. The system of claim 10, wherein the one or more documents include one or more of electronic text document or code, or combination thereof.

14. The system of claim 10, wherein the computer executable module further discovers the duplicate content.

* * * * *